Patented Sept. 8, 1936

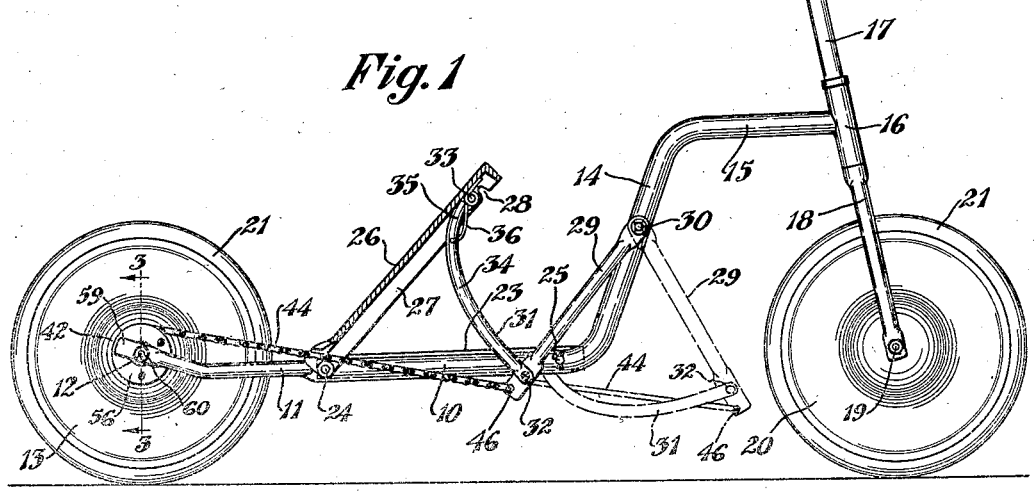

2,053,835

UNITED STATES PATENT OFFICE 2,053,835

SELF-PROPELLED VEHICLE

William D. Kimball and Lyle J. Hedden, Barberton, and Clayton L. Arnold, Massillon, Ohio Application December 23, 1933, Serial No. 703,688

3 Claims. (Cl. 208—35)

The invention relates to vehicles and more particularly to a self-propelled vehicle especially adapted for the use of children.

The invention is illustrated as applied to a type of juvenile vehicle commonly known as a "scooter" and adapted to be ridden by the operator in a standing position, being provided with a pedal operated driving means. This application is an improvement upon the type of self-propelled vehicle disclosed in Patent No. 1,591,535, issued July 6, 1926 to Nathan D. Kimball.

In the patent above referred to, the driving means included a rack and pinion and it has been found that in use such a driving mechanism has certain disadvantages owing to the fact that the rack bar reciprocates rearwardly beyond the back wheel of the vehicle in such a manner that there is danger of a child being injured upon the same.

The object of the present improvement is to provide a self-propelled vehicle with a driving means which is not only simple and effective but is so constructed as to not provide any obstruction or projection upon which the operator may be injured.

Another object is to provide a vehicle of this character having a driving means including a pulley and chain arranged to be operated by a pedal or the like.

A further object of the improvement is to provide a self-propelled vehicle in which the driving means includes a swinging link connecting the pedal with the drive mechanism, said link being so shaped as to produce the maximum power with a minimum amount of effort.

The above, together with other objects which will be hereinafter pointed out or which will be apparent from an examination of the drawing and the following description, may be attained by constructing the improved self-propelled vehicle in the manner illustrated in the accompanying drawing, in which Figure 1 is a side elevation of the improved self-propelled vehicle, parts being broken away for the purpose of illustration;

Fig. 2, a top plan view of the vehicle with the steering post broken away;

Fig. 3 an enlarged transverse section through the axis of the traction wheel of the vehicle taken as on the line 3—3, Fig. 1;

Fig. 4, a section showing the spring rewind for the driving pulley taken on the line 4—4, Fig. 3;

Fig. 5, a section through the driving pulley showing the driving chain connected thereto taken as on the line 5—5, Fig. 3; and Fig. 6, a section through the ratchet mechanism of the driving pulley, taken on the line 6—6, Fig. 3.

Similar numerals refer to similar parts throughout the drawing.

The improved vehicle includes a frame preferably formed of tubular material indicated generally at 10, provided with the integral rear fork 11 which carries the rear axle 12 upon which the rear wheel indicated generally at 13 is journaled. The frame 10 is preferably bent upward into nearly upright position intermediate its ends as indicated at 14, the forward portion 15 of the frame being substantially horizontal and located in a plane considerably above the main portion 10, and provided at its forward end with the inclined tubular bearing 16 in which the steering post 17 is journaled. A fork 18 is provided at the lower end of the steering post to accommodate the front axle 19 upon which is journaled the front wheel 20.

The wheels 13 and 20 may be of any suitable construction and for the purpose of illustration they are shown as disk wheels formed of sheet metal of suitable gauge and provided with rubber tires 21. Handle bars 22 are provided upon the upper end of the steering post 17 at a suitable height to be grasped by the hands of the operator when standing with the left foot upon the platform 23 which may be rigidly secured to the frame 10 by any suitable means such as the bolts 24 and 25. The pedal 26 may be pivotally mounted upon the bolt 24 and provided with a depending flange 27 having a notch 28 near its free end portion for engaging with the projecting end of the bolt 25 in order to act as a stop to limit the downward movement of the pedal.

The upper end of the lever 29 is pivoted to the upright portion 14 of the frame as indicated at 30, so that this lever depends from its pivotal connection and has swinging movement in the manner of a pendulum, the lower end of the lever preferably terminating below the platform 23. A link 31 is pivoted at its lower end to the lower end portion of the lever 29, as indicated at 32 and the upper end of said link is pivotally connected to the underside of the pedal 26, as indicated at 33.

This link is of a peculiar shape, as best shown in Fig. 1, the particular shape having been found to be advantageous in developing a maximum amount of power with a minimum of effort. As shown in the drawing, the lower end portion of the link is substantially straight, after which the link curves upward and to the right as shown at 34, the curvature increasing toward the upper end of the link as shown at 35, so that the link will engage the pedal at this point, to the rear of the pivot 33, and act as a stop for the pedal in the normal position, as shown in full lines in Fig. 1.

In the normal position of the parts the pedal 26 is raised and the lever 29 is swung upon its pivot to the left as shown in full lines in Fig. 1. When the pedal is depressed into substantially horizontal position as shown in broken lines in Fig. 1, the lever 29 is swung to the right and the link assumes the position shown in broken lines in said figure. A spring 36 may be connected to the pedal for engagement with the link in order to assist in raising the pedal to the normal position.

The axle 12 may be in the form of a screw as shown in Fig. 3 and a pair of roller bearings 37 are mounted thereon providing bearings for the rear wheel 13. Nuts 38 and 39 are located upon the axle on opposite sides of the rear wheel, one furcation of the rear fork 11, as indicated at 40, being located between the nut 39 and a nut 41.

The drive pulley indicated generally at 42 is journaled upon a bushing 43 upon the axle and one end of the drive chain 44 is fixed to said pulley as by the screw 45, the chain being normally wrapped around the pulley about two full revolutions as shown in Fig. 5, the other end of the chain being attached to the lower end of the lever 29, as indicated at 46.

For the purpose of permitting continuous rotation of the wheel 13 in a forward direction, a roller clutch 47 is formed upon the drive pulley and provided with the angular notches 48 within which are located the rollers 49 adapted to frictionally engage the annular flange 50 carried by the wheel 13.

For the purpose of returning the drive pulley to normal position in order to rewind the chain thereon, after each downward movement of the pedal 26, the drive pulley may be provided upon one side with an annular pocket 51 within which is located a spiral spring 52, the outer end of which is connected to the pulley as by a rivet 53, the inner end being connected, as by a screw 54, to a collar 55 fixed upon the axle 12.

A cover plate 56 may be provided for the pocket 51 of the pulley and attached thereto as by the screws 57. A spacer 58 is located between the pulley and the furcation 59 of the rear fork 11, a nut 60 being mounted upon the end portion of the axle beyond said bifurcation.

In the operation of the vehicle, the person may stand with one foot upon the platform 23 and operate the pedal 26 with the other foot. It will be seen that with the pedal in the raised or normal position, the chain is wrapped about twice around the pedal in a spiral as shown in Fig. 5. The chain being thus wrapped upon itself, it will be seen that greater leverage is obtained, thus producing more power at the start of each depression of the pedal while as the chain unwinds, greater speed is produced toward the end of each operation of the pedal.

As the pedal reaches the substantially horizontal position and contacts with the stop 25, the overrunning roller clutch will permit the rear wheel 13 to continue to freely rotate forward and the spiral spring 52, assisted by the spring 36, will raise the pedal to the normal position, rewinding the chain upon the pulley, when the operation may be continued.

Although the invention is illustrated and described as particularly applied to a two wheel juvenile vehicle, it should be understood that the invention resides in the driving mechanism rather than in the vehicle per se and that this improved driving mechanism may be applied without change to various other forms of vehicles.

We claim:

1. A vehicle including a frame, a drive wheel upon the frame, a lever depending from the frame, a chain connected at one end to the lower end of the lever, a pulley to which the other end of the chain is connected and associated with the drive wheel, a pedal mounted on the frame, a link pivotally connecting the pedal to the lever for imparting swinging movement to said lever, the link being curved toward the pedal and the curvature increasing toward the upper end of the link so as to engage the pedal at a point to the rear of the pivot between the link and pedal to act as a stop for the pedal, and means for returning the lever to normal position.

2. A vehicle including a frame, a drive wheel upon the frame, a lever depending from the frame, means operatively connecting the lever with the drive wheel, a pedal mounted on the frame, a link pivotally connecting the pedal to the lever for imparting swinging movement to said lever, the link being curved toward the pedal and the curvature increasing toward the upper end of the link so as to engage the pedal at a point to the rear of the pivot between the link and pedal to act as a stop for the pedal, and means for returning the lever to normal position.

3. A vehicle including an integral tubular frame member bent to form a substantially horizontal rear portion terminating in a fork, an intermediate upright portion and a substantially horizontal forward portion having an upright tubular bearing at its forward end, a steering column journaled in said tubular bearing, a wheel carried by said steering column, a drive wheel journaled in said fork, a lever pivoted at its upper end upon said upright portion of the frame, a pedal pivoted at one end upon said horizontal rear portion of the frame, a link pivotally connecting the lever to the pedal for imparting a swinging movement to the lever, the link being curved toward the pedal and the curvature increasing toward the pedal, a pulley associated with the drive wheel, a chain connected at one end to said pulley and at its other end to the lower end of said lever, an overrunning clutch for operatively connecting the drive wheel to the pulley and spring means for rotating the pulley in reverse direction.

WILLIAM D. KIMBALL.
LYLE J. HEDDEN.
CLAYTON L. ARNOLD.